United States Patent
Short et al.

(10) Patent No.: US 8,845,275 B2
(45) Date of Patent: Sep. 30, 2014

(54) CRANKING PAD INTERLOCK

(75) Inventors: Keith E. Short, Rockford, IL (US); Jeff A. Brown, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 993 days.

(21) Appl. No.: 12/944,303

(22) Filed: Nov. 11, 2010

(65) Prior Publication Data

US 2012/0121373 A1 May 17, 2012

(51) Int. Cl.
| | |
|---|---|
| F01D 15/06 | (2006.01) |
| F01D 15/12 | (2006.01) |
| F02C 7/32 | (2006.01) |
| F02C 7/36 | (2006.01) |
| F16H 57/00 | (2012.01) |

(52) U.S. Cl.
CPC ........... F02C 7/36 (2013.01); F05D 2260/4031 (2013.01); F01D 15/12 (2013.01); F05D 2260/30 (2013.01); F02C 7/32 (2013.01); F16H 57/00 (2013.01)
USPC .......................... 415/124; 415/124.1; 415/125

(58) Field of Classification Search
USPC ................. 415/122.1, 125, 124, 124.1, 124.2
See application file for complete search history.

(56) References Cited

U.S. PATENT DOCUMENTS

| | | | |
|---|---|---|---|
| 3,404,579 A | 10/1968 | Feller | |
| 3,485,041 A | 12/1969 | Evans | |
| 3,919,894 A | 11/1975 | Keeter et al. | |
| 4,437,809 A * | 3/1984 | Nutter | 415/41 |
| 4,643,637 A | 2/1987 | Strickler | |
| 5,088,341 A | 2/1992 | Hyde et al. | |
| 5,813,829 A * | 9/1998 | Mazzotta | 415/123 |
| 5,971,621 A * | 10/1999 | Oyafuso et al. | 384/539 |
| 6,382,909 B1 * | 5/2002 | Voorhees | 415/124 |
| 7,559,739 B2 | 7/2009 | Colonna et al. | |

FOREIGN PATENT DOCUMENTS

| | | |
|---|---|---|
| EP | 0754838 A1 | 1/1997 |
| EP | 1609957 A2 | 12/2005 |

OTHER PUBLICATIONS

European Search Report, May 4, 2012, Application No. 11192026.0-2321; 6 pages.

* cited by examiner

*Primary Examiner* — Edward Look
*Assistant Examiner* — Adam W Brown
(74) *Attorney, Agent, or Firm* — Cantor Colburn LLP (57) ABSTRACT

A cranking pad assembly for a gearbox of a turbomachine including a cranking pad shaft rotatably secured in a gearbox housing and engageable with a gearbox drivetrain when urged inwardly into the gearbox housing. The cranking pad shaft includes an interface for a cranking tool. An interlock pin retains the cranking tool at the cranking pad shaft and a disconnect spring is operably connected to the gearbox housing to bias the cranking pad shaft outwardly from the gearbox housing.

17 Claims, 7 Drawing Sheets

CRANKING PAD INTERLOCK

BACKGROUND OF THE INVENTION

The subject matter disclosed herein relates to turbomachines. More specifically, means for manually rotating an interior shaft of a turbomachine when the turbomachine is not operating.

When performing maintenance and/or inspection (such as boroscope inspection) of a turbomachine, for example, a gas turbine engine for an aircraft, it is often desired to rotate the shaft of the gas turbine to provide access to interior components of the core of the gas turbine. This is typically accomplished by turning the accessory gearbox which is connected to the core. To turn the accessory gearbox, a simple cover is removed from the gearbox and a cranking tool is inserted into a cranking pad of the gearbox and the cranking tool is used to rotate the gearbox which in turn rotates the shaft of the gas turbine. Once the cranking operation is completed, the tool is removed and the cover must be replaced to seal the gearbox and gas turbine from oil leakage. If the cover is not replaced, the oil leakage can result in damage to and/or failure of the gas turbine.

BRIEF DESCRIPTION OF THE INVENTION

A cranking pad assembly for a gearbox of a turbomachine including a cranking pad shaft rotatably secured in a gearbox housing and engageable with a gearbox drivetrain when urged inwardly into the gearbox housing. The cranking pad shaft includes an interface for a cranking tool. An interlock pin retains the cranking tool at the cranking pad shaft and a disconnect spring is operably connected to the gearbox housing to bias the cranking pad shaft outwardly from the gearbox housing.

A turbomachine system includes a turbomachine having a turbine shaft and a gearbox operably connected to the turbine shaft. The system includes a cranking pad assembly having a cranking pad shaft rotatably secured in a gearbox housing and engageable with a gearbox drivetrain when urged inwardly into the gearbox housing. The cranking pad shaft includes an interface for a cranking tool, an interlock pin to retain the cranking tool at the cranking pad shaft, and a disconnect spring operably connected to the gearbox housing to bias the cranking pad shaft outwardly from the gearbox housing.

A method of rotating a turbine shaft includes connecting a gearbox to a turbine shaft and inserting a cranking tool into a cranking pad shaft of the gearbox. An interlock pin is urged radially outwardly by the insertion of the cranking tool into the cranking pad shaft and the cranking pad shaft is pushed into engagement with a drivetrain of the gearbox. The cranking tool is retained at the cranking pad shaft via the interlock pin. The cranking tool is rotated about a gearbox axis to rotate the turbine shaft. Removal of the cranking tool ensures that the cranking pad shaft is disconnected from the drivetrain.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
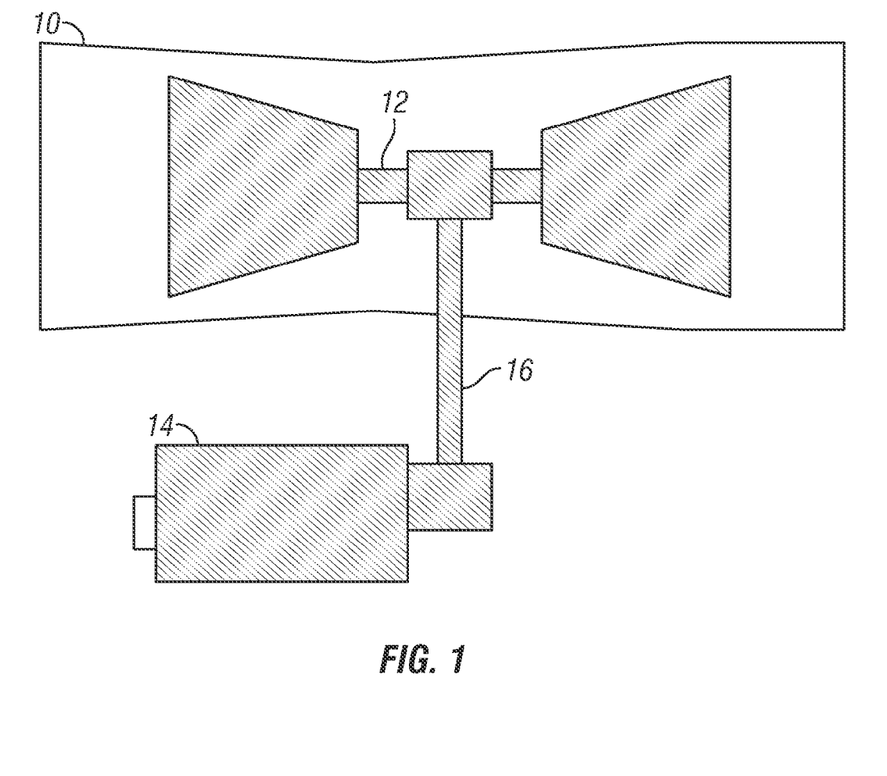
FIG. 1 is a schematic of an exemplary turbomachine.

Shown in FIG. 1 is an embodiment of a turbomachine, for example, gas turbine 10, having a turbine shaft 12. The turbine shaft 12 is connected to a gearbox 14 via a transmission shaft 16 such that the turbine shaft 12 can be rotated via rotation of the transmission shaft 16.

Figure 2:
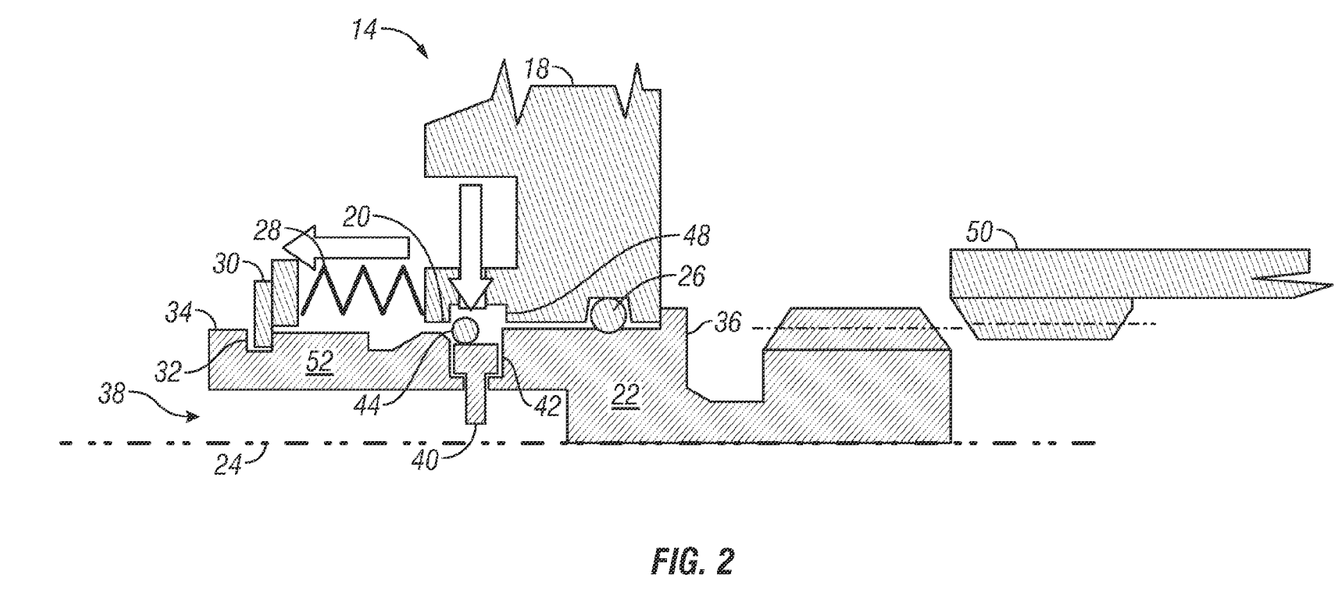
FIG. 2 is a cross-sectional view of an exemplary embodiment of a cranking pad interlock.

Referring now to FIG. 2, the gearbox 14 includes a gearbox housing 18 in which the components of the gearbox 14 are located. The gearbox housing 18 includes a crank pad opening 20 through which a crank pad shaft 22 extends. The crank pad shaft 22 is rotatably secured in the gearbox 14 at a gearbox axis 24 and is sealed to the gearbox housing 18 via one or more seals 26 to prevent leakage of oil or other substances from the gearbox 14 and to prevent contamination of the gearbox 14.

The crank pad shaft 22 is biased outwardly from the gearbox housing 18 by a disconnect spring 28. The disconnect spring 28 may be interactive with a disconnect clip 30 located in a clip groove 32 in an outer surface 34 of the crank pad shaft 22 to bias the crank pad shaft 22 outwardly from the gearbox housing 18. A shaft stop 36 at the crank pad shaft 22 limits an outward travel of the crank pad shaft 22 by an interference with the gearbox housing 18. The crank pad shaft 22 includes a tool cavity 38, with an interlock pin 40 extending from a shaft detent 42 in the outer surface 34 through the crank pad shaft 22 into the tool cavity 38. The tool cavity 38 may be a ⅜" square drive or other suitable configuration. A spring clip 44 is located in the shaft detent 42 radially outboard of the interlock pin 40. When the spring clip 44 is in the shaft detent 42, the spring clip 44 blocks axial travel of the crank pad shaft 22 by an interference between the crank pad shaft 22, the spring clip 44 and the gearbox housing 18. The travel is blocked even if a force great enough to overcome the spring force of the disconnect spring 28 is applied by, for example, pushing axially on the crank pad shaft 22.

Figure 3:
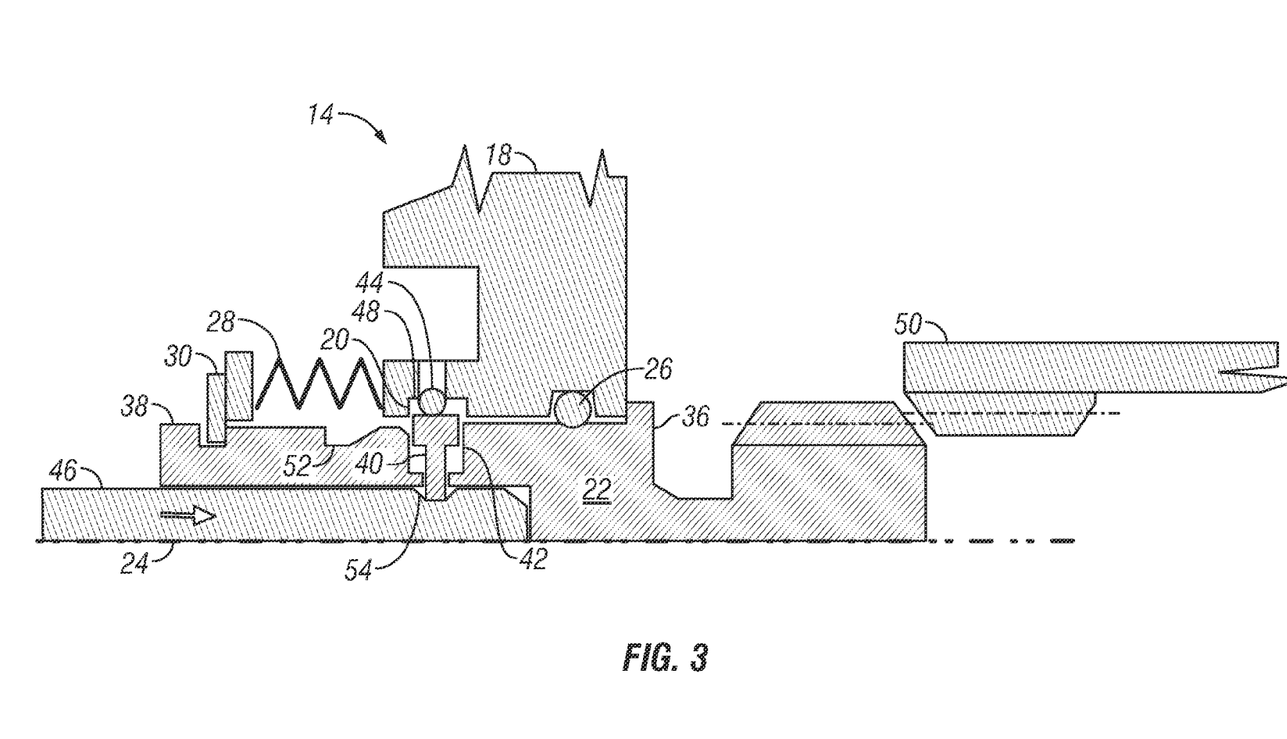
FIG. 3 is a cross-sectional view of an exemplary embodiment of a cranking pad interlock with a cranking tool installed.
Figure 4:
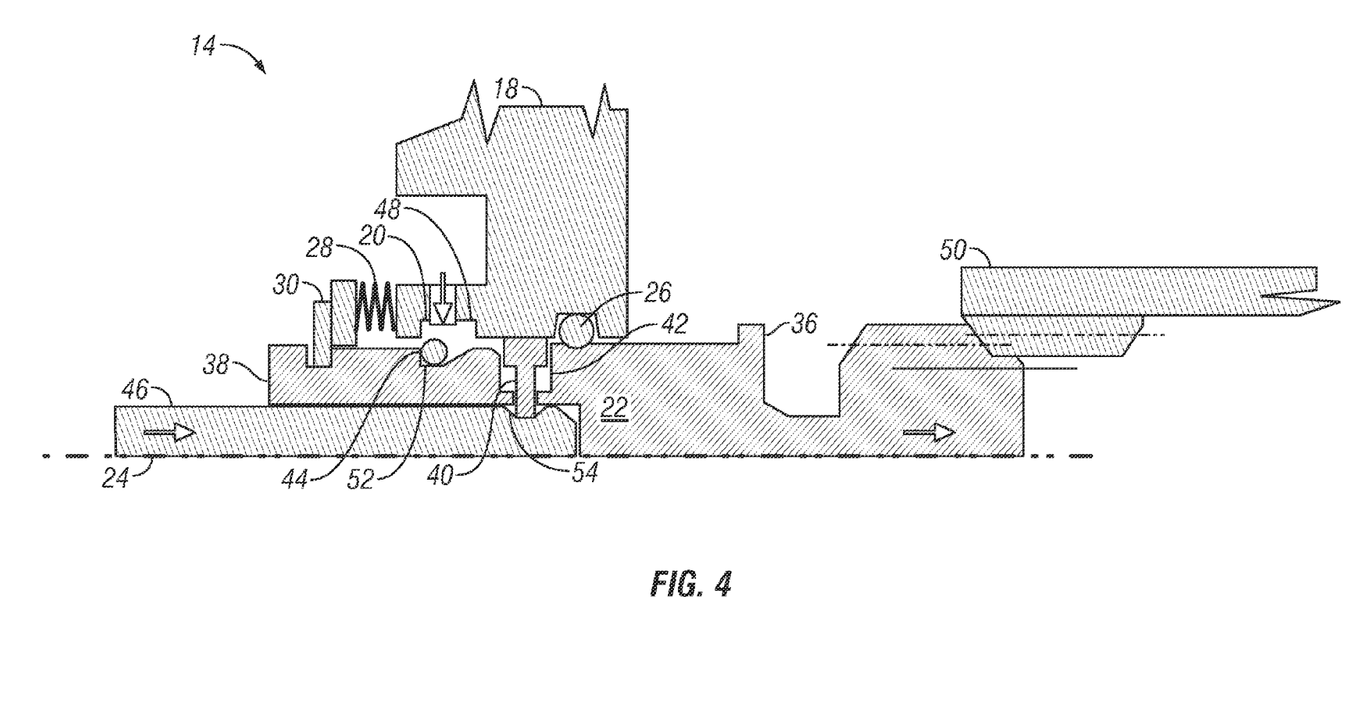
FIG. 4 is a cross-sectional view of an exemplary embodiment of a cranking pad interlock engaging a drivetrain.

Referring to FIG. 3, the tool cavity 38 is configured so that a cranking tool 46 is insertable into the tool cavity 38. When the cranking tool 46 is inserted into the tool cavity 38, the cranking tool 46 pushes the interlock pin 40 radially outwardly which pushes the spring clip 44 out of the shaft detent 42 and into a housing cavity 48. As the cranking tool extends into the tool cavity, the interlock pin 40 follows the profile of the cranking tool and settles into a tool detent 54 which aligns the outside surface of the interlock pin 40 with the housing 18 bore and the spring clip 44 is aligned with the outer diameter of the cranking shaft 22. The cranking pad shaft 22 and the cranking tool 46 may now be pushed axially inwardly into the gearbox housing 18 by overcoming the spring force of the disconnect spring 28. As shown in FIG. 4, as the cranking pad shaft 22 moves axially inward, the cranking pad shaft 22 engages a gearbox drivetrain 50. The engagement between the cranking pad shaft 22 and the gearbox drivetrain 50 may be, for example, a spline connection. The spring clip 44 falls radially inwardly into a locking detent 52 in the cranking pad shaft 22 to again limit the axial travel of the cranking pad shaft 22 by interference between the cranking pad shaft 22, the spring clip 44 and the gearbox housing 18. The interlock pin 40 which has extended into the tool detent 54 in the cranking tool 46 locks the cranking tool 46 in engagement with the cranking pad shaft 22. Once the cranking pad shaft 22 is engaged with the drivetrain 50, the cranking tool 46 is rotated thus rotating the cranking pad shaft 22 and the drivetrain 50. The drivetrain 50 is connected to turbine shaft 12 via the transmission shaft 16, so rotational energy is transferred to the turbine shaft 12, rotating it.

Figure 5:
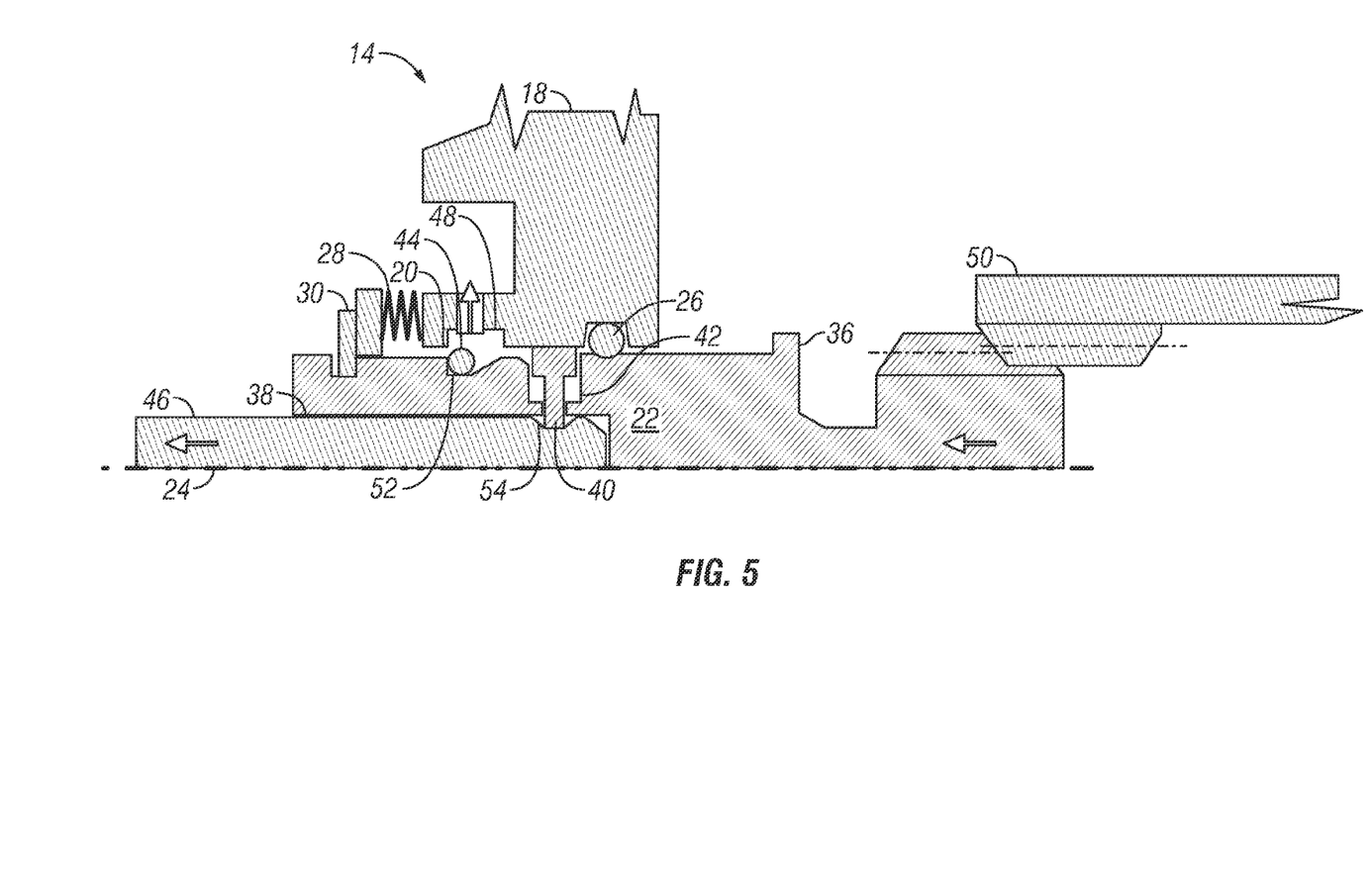
FIG. 5 is a cross-sectional view of an exemplary embodiment of a cranking pad interlock disengaging a drivetrain.

Referring to FIG. 5, to disengage the cranking pad shaft 22 from the drivetrain 50 and remove the cranking tool 46, the cranking tool 46 is pulled axially outwardly from the crankshaft housing 18. This axially outwardly movement pulls the cranking pad shaft 22 from engagement with the drivetrain 50 because the interlock pin 40 is positioned in the tool detent 54. The axial motion forces the spring clip 44 out of the locking detent 52 and into the housing cavity 48.

Figure 6:
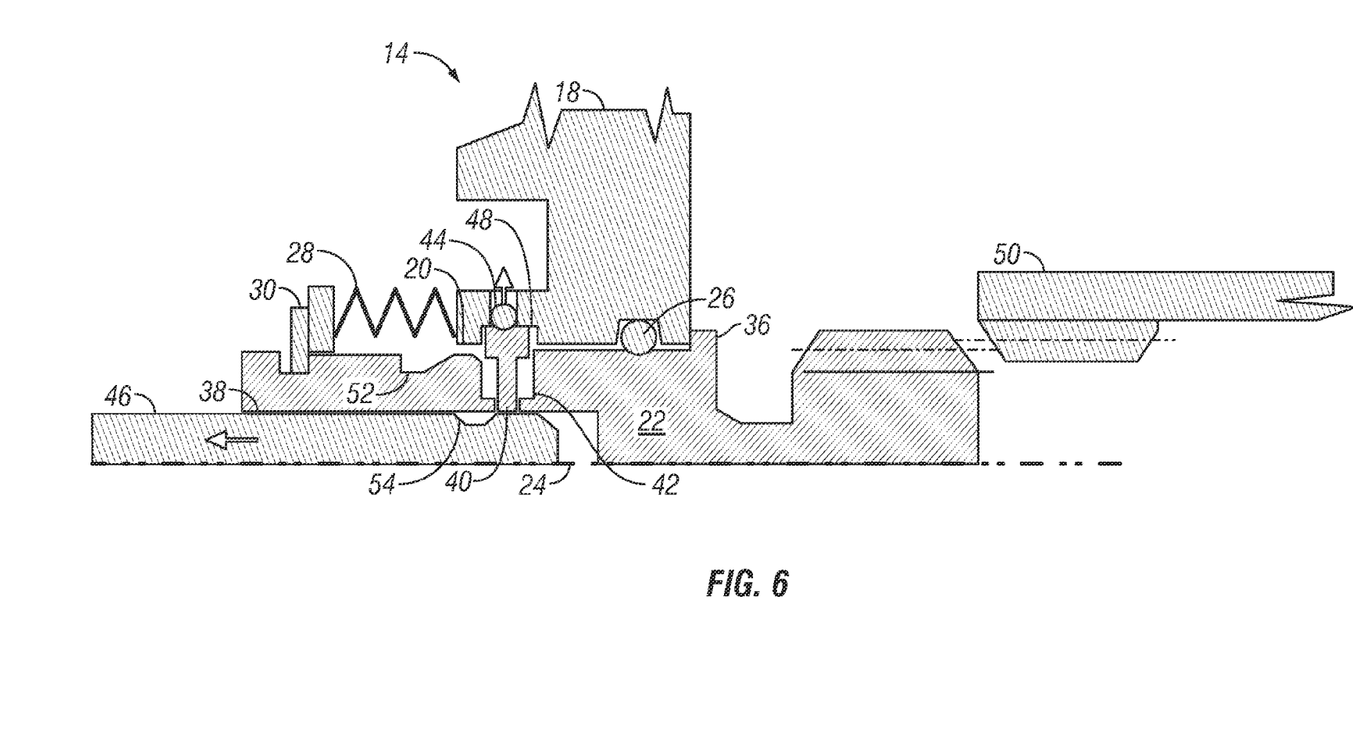
FIG. 6 is a cross-sectional view of an exemplary embodiment of a cranking pad interlock with a cranking tool withdrawing therefrom.
Figure 7:
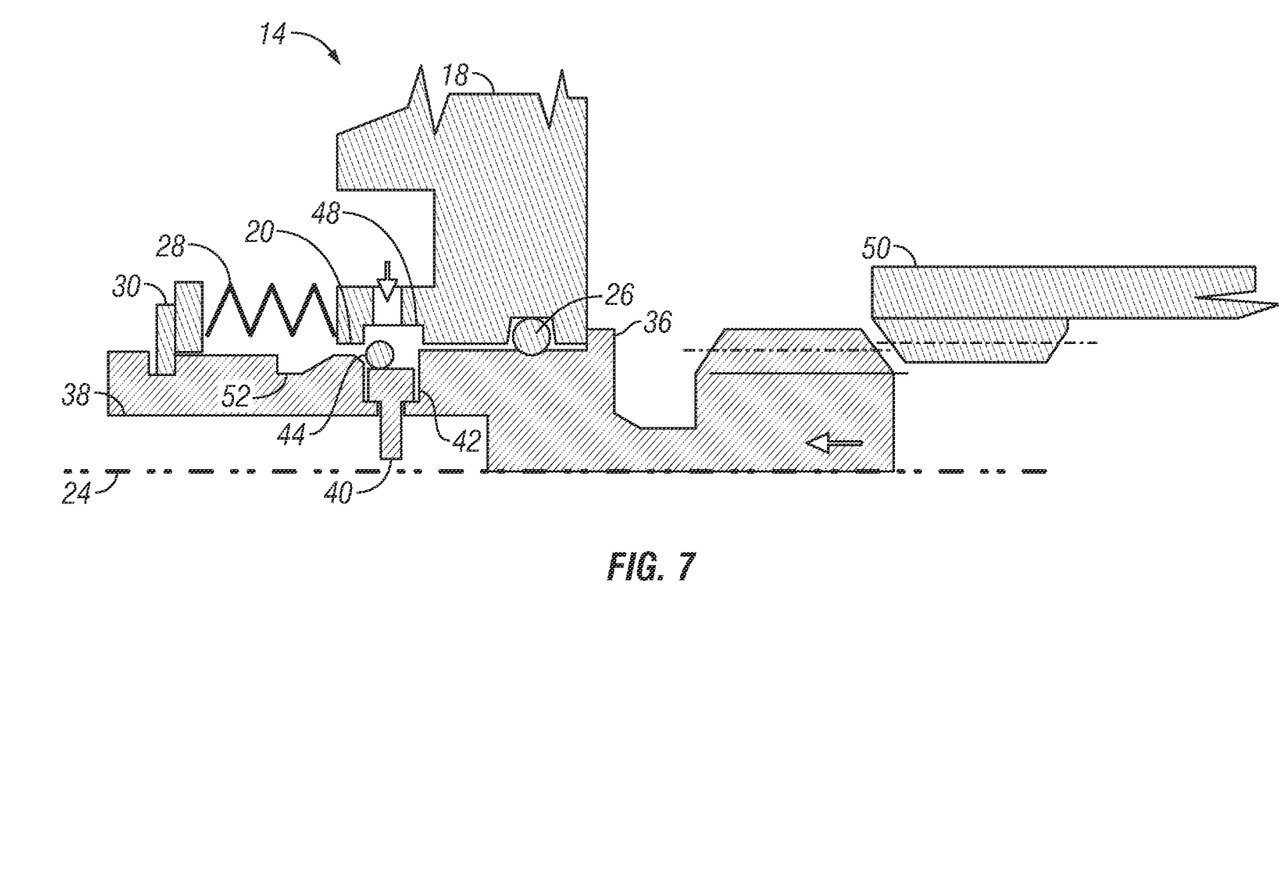
FIG. 7 is a cross-sectional view of an exemplary embodiment of a cranking pad interlock with a cranking tool withdrawn.

Now referring to FIG. 6, the cranking tool 46 cannot be disengaged from the cranking pad shaft 22 until the cranking pad shaft 22 has traveled sufficiently far that the interlock pin 40 can be pushed radially outward into the housing cavity 48 behind the spring clip 44. When the cranking tool 46 is withdrawn from the tool cavity as shown in FIG. 7, the spring clip 44 forces the interlock pin 40 radially inward into the shaft detent 42. Now, the axial position of the cranking pad shaft 22 is locked by the bias of the disconnect spring 28 and by the interference between the spring clip 44 and the gearbox housing 18 and cranking pad shaft 22.

Use of this cranking configuration with the interlock pin 40 and spring clip 44 ensures disengagement of the cranking pad shaft 22 from the drivetrain 50 when the cranking tool 46 is removed. Further, the gearbox housing 18 remains sealed to prevent leakage from the gearbox 14 and/or contamination of the gearbox 14 without the need for a cover of the prior art. Further, this configuration removes the human element of having to reinstall a cover after removal thereby preventing leakage and contamination leading to failure of the gearbox and/or the gas turbine.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cranking pad assembly for a gearbox of a turbomachine comprising:
   a cranking pad shaft rotatably secured in a gearbox housing and engageable with a gearbox drivetrain when urged inwardly into the gearbox housing, the cranking pad shaft including an interface for a cranking tool;
   an interlock pin to retain the cranking tool at the cranking pad shaft;
   a disconnect spring operably connected to the gearbox housing to bias the cranking pad shaft outwardly from the gearbox housing;
   a spring clip disposed between the gearbox housing and the cranking pad shaft to limit axial movement of the cranking pad shaft relative to the gearbox housing, the spring clip movable radially outwardly into a housing cavity via radially outwardly movement of the interlock pin to unlock an axial position of the cranking pad shaft.

2. The cranking pad assembly of claim 1, wherein the spring clip is movable into a shaft detent of the cranking pad shaft to allow axial movement of the cranking pad shaft into engagement with the drivetrain.

3. The cranking pad assembly of claim 1, further comprising a seal disposed between the cranking pad shaft and the gearbox housing.

4. The cranking pad assembly of claim 1, wherein the interlock pin is extendable through the cranking pad shaft into the cranking tool to retain the cranking tool.

5. The cranking pad assembly of claim 4, wherein the interlock pin is extendable into a tooling detent of the cranking tool.

6. A turbomachine system comprising:
   a turbomachine including a turbine shaft;
   a gearbox operably connected to the turbine shaft; and
   a cranking pad assembly including:
      a cranking pad shaft rotatably secured in a gearbox housing and engageable with a gearbox drivetrain when urged inwardly into the gearbox housing, the cranking pad shaft including an interface for a cranking tool;
      an interlock pin to retain the cranking tool at the cranking pad shaft;
      a disconnect spring operably connected to the gearbox housing to bias the cranking pad shaft outwardly from the gearbox housing; and
      a spring clip disposed between the gearbox housing and the cranking pad shaft to limit axial movement of the cranking pad shaft relative to the gearbox housing, the spring clip movable radially outwardly into a hosing cavity via radially outwardly movement of the interlock pin to unlock an axial position of the cranking pad shaft.

7. The turbomachine system of claim 6, wherein the spring clip is movable into a shaft detent of the cranking pad shaft to allow axial movement of the cranking pad shaft into engagement with the drivetrain.

8. The turbomachine system of claim 6, further comprising a seal disposed between the cranking pad shaft and the gearbox housing.

9. The turbomachine system of claim 6, wherein the interlock pin is extendable through the cranking pad shaft into the cranking tool to retain the cranking tool.

10. The turbomachine system of claim 9, wherein the interlock pin is extendable into a tooling detent of the cranking tool.

11. The turbomachine system of claim 6, wherein rotation of the cranking pad shaft when engaged with the drivetrain urges rotation of the turbine shaft.

12. The turbomachine system of claim 6, wherein the turbomachine is a gas turbine.

13. A method of rotating a turbine shaft comprising:
   connecting a gearbox to a turbine shaft;
   inserting a cranking tool into a cranking pad shaft of the gearbox;

urging an interlock pin radially outwardly by the insertion of the cranking tool into the cranking pad shaft;

urging a spring clip radially outwardly into a housing cavity via radially outwardly movement of the interlock pin to unlock an axial position of the cranking pad shaft;

pushing the cranking pad shaft into engagement with a drivetrain of the gearbox;

retaining the cranking tool at the cranking pad shaft via the interlock pin; and rotating the cranking tool about a gearbox axis to rotate the turbine shaft.

14. The method of claim 13, further comprising:

biasing a position of the cranking pad shaft away from the drivetrain; and overcoming the bias by pushing the cranking pad shaft into engagement with the drivetrain.

15. The method of claim 13, further comprising limiting a travel of the cranking pad shaft along the gearbox axis via the spring clip located between the cranking pad shaft and a gearbox housing.

16. The method of claim 13, further comprising pulling at the cranking tool to disengage the cranking pad shaft from the drivetrain.

17. The method of claim 16, further comprising retracting the interlock pin into the housing cavity to allow removal of the cranking tool from the cranking pad shaft.

* * * * *